Figure 1:
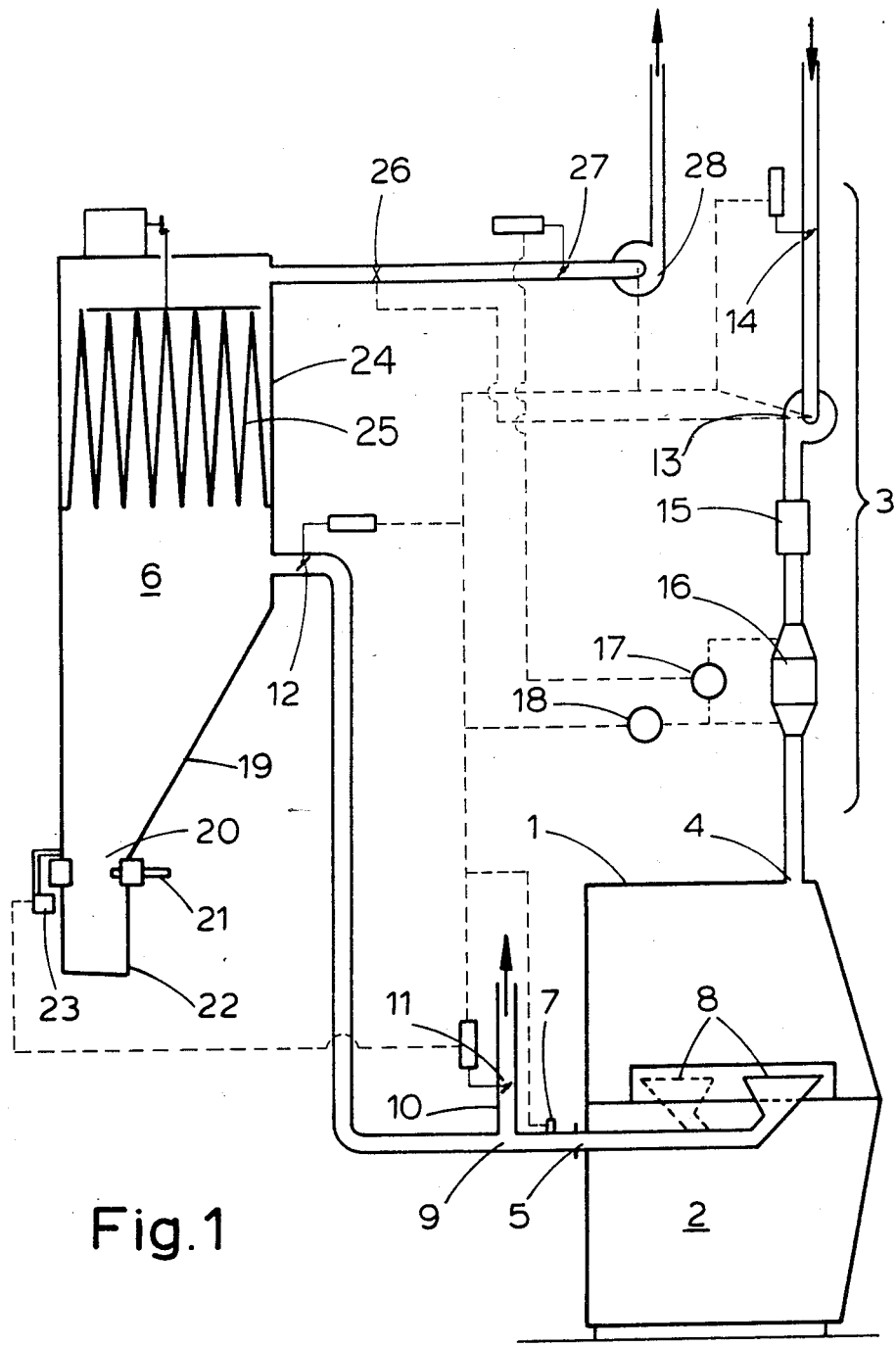

United States Patent [19]

Manning

[11] Patent Number: 4,576,619

[45] Date of Patent: Mar. 18, 1986

[54] DUST RECOVERY APPARATUS

[75] Inventor: Graham P. Manning, Welwyn, England

[73] Assignee: Smith Kline & French Laboratories Limited, Welwyn Garden City, England

[21] Appl. No.: 571,604

[22] Filed: Jan. 17, 1984

[30] Foreign Application Priority Data

Feb. 2, 1983 [GB] United Kingdom ............... 8302835

[51] Int. Cl.⁴ ..................... B01D 46/46; B01D 50/00
[52] U.S. Cl. ........................................ 55/213; 55/314; 55/385 R; 55/473; 55/DIG. 18; 98/115.1; 425/210; 425/217
[58] Field of Search ............ 55/21, 212, 213, 312–314, 55/385 R, 471, 472, 473, DIG. 18, 304; 98/115 R; 264/37; 425/210, 215–217

[56] References Cited

U.S. PATENT DOCUMENTS

| | | | |
|---|---|---|---|
| 2,579,401 | 12/1951 | Schneible et al. | 98/115 R |
| 2,593,702 | 4/1952 | Schneible | 98/115 R |
| 2,710,574 | 6/1955 | Runion | 98/115 R |
| 3,811,248 | 5/1974 | Lesk et al. | 55/283 |
| 4,247,227 | 1/1981 | Göhler et al. | 55/283 |
| 4,255,169 | 3/1981 | Leliaert et al. | 55/314 |
| 4,400,148 | 8/1983 | Lawrence et al. | 264/37 |

Primary Examiner—David L. Lacey
Attorney, Agent, or Firm—Joseph A. Marlino; Stuart R. Suter; Alan D. Lourie

[57] ABSTRACT

Dust recovery apparatus is disclosed which recovers air-entrained dust in a high state of purity. The apparatus comprises a housing capable of sustaining at least slight positive pressure and suitable for accommodating powder processing machinery, an air supply system for passing air at a predetermined rate and at a slight positive pressure to the housing, a collector which collects dust entrained in air leaving the housing and an air-flow rate sensor which detects air-flow rate in the apparatus and activates valves for stopping air passing to the collector when the air-flow rate falls outside a predetermined range.

6 Claims, 2 Drawing Figures

… … …

DUST RECOVERY APPARATUS

This invention relates to dust recovery apparatus for recovering dust entrained in air.

Some unit operations of manufacture involve handling powdered materials. Examples of such unit operations are tableting pharmaceuticals and the filling of pharmaceutical capsules. Machinery for carrying out such unit operations is referred to herein generally as "powder processing machinery". A problem with these unit operations is that dust is generated. Usually, the powder processing machinery is housed in a hood or jacket. The air in the hood or jacket is extracted and vented via a dust collector to atmosphere. The dust recovered in this way is not suitable for direct reuse in the preparation of pharmaceuticals because it is contaminated.

It has now been found that if the powder processing machinery is kept under positive pressure at a constant flow rate, air-entrained dust can be removed in a state or purity which is sufficiently high to be reused directly in the manufacture of pharmaceuticals.

According to the present invention there is provided dust recovery apparatus comprising a housing capable of sustaining at least slight positive pressure and suitable for accommodating powder processing machinery, the housing having an inlet leading to a source of air and an outlet connected to an exhaust outlet via a collector for collecting air-entrained dust, means for passing air at a predetermined rate through the apparatus while maintaining a slight positive pressure in the housing and an air-flow rate sensor which detects air-flow rate in the apparatus and triggers means for stopping air passing to the collector when the air-flow rate falls outside a predetermined range.

The means for passing air through the apparatus can comprise a supply fan, the outlet side of which is connected via a constant volume regulator and an absolute filter to the inlet in the housing. Preferably there is, in addition, an extractor fan connected to the outlet side of the collector.

A typical constant volume regulator consists of a motorized damper and associated flow sensor and control system. The sensor and control system opens or closes the damper to maintain a predetermined flow rate.

An absolute filter removes any airborne impurities which would contaminate the powder being processed. The particular filter selected in any particular case depends upon the process and can be chosen by standard methods.

The housing is suitable to accommodate powder processing machinery for example a tableting or capsule filling machine, a sachet filling machine or de-dusting equipment. If the powder processing machinery is fed with powder from a source outside the housing or discharges the product to a point outside the housing, the powder inlet and product outlet are of such a size that the positive pressure can still be maintained inside the housing while air is escaping therefrom.

The air outlet from the housing is connected to a collector.

Optionally, where two powder processing machines are working in sequence (for example a tableting machine and tablet de-dusting equipment) the housing can be divided into two separate compartments so that each machine is contained separately. These compartments can be connected in parallel to the source of air and to the collector. Alternatively, an outlet for air can be provided in one (the first) compartment which is connected to the inlet of the other (the second) compartment. The outlets from each can then combine and lead to the collector.

The collector can consist of an airtight hopper provided at its lower end with an outlet to which a bin can be fitted so as to make an airtight connection. Air from the housing is led into the top of the hopper. As the air enters the hopper the velocity drops, and larger entrained dust particles fall into the bin.

Preferably the collector is provided with a filter above the hopper through which the air passes. The filter removes smaller particles of dust which remain entrained in the air. The filter can be electrostatic. Preferably it is a bag filter. Preferably the filter material is non-blinding, that it is substantially impervious to the dust which remains on the surface of the material. Beyond the filter the collector is connected to an exhaust outlet via a fan.

A flow rate sensor is located between the filter and the exhaust outlet. If the flow rate drops the sensor triggers a mechanism which stops air passing to the collector. For example the sensor can trigger a switch which turns off the fan supplying air to the housing. Alternatively, or in addition, the sensor can trigger a mechanism which isolates the housing outlet from the collector and connects it directly to exhaust.

Preferably the filter is provided with means for removing dust trapped on it. For example, the filter can be fitted with a mechanical shaker which shakes the filter and causes trapped dust to fall into the hopper and bin.

As the apparatus runs, the filter becomes blocked by trapped dust and the resistance to air-flow through the apparatus increases. Increasing resistance causes a decrease in flow between the filter and the exhaust. The apparatus is preferably provided with a sensor which progressively opens means (for example a motorized valve or a motorized damper) which compensate for this increasing resistance.

It will be appreciated that two pieces of dust recovery apparatus according to this invention could share a common means for supplying air or a common collector.

Figure 2:
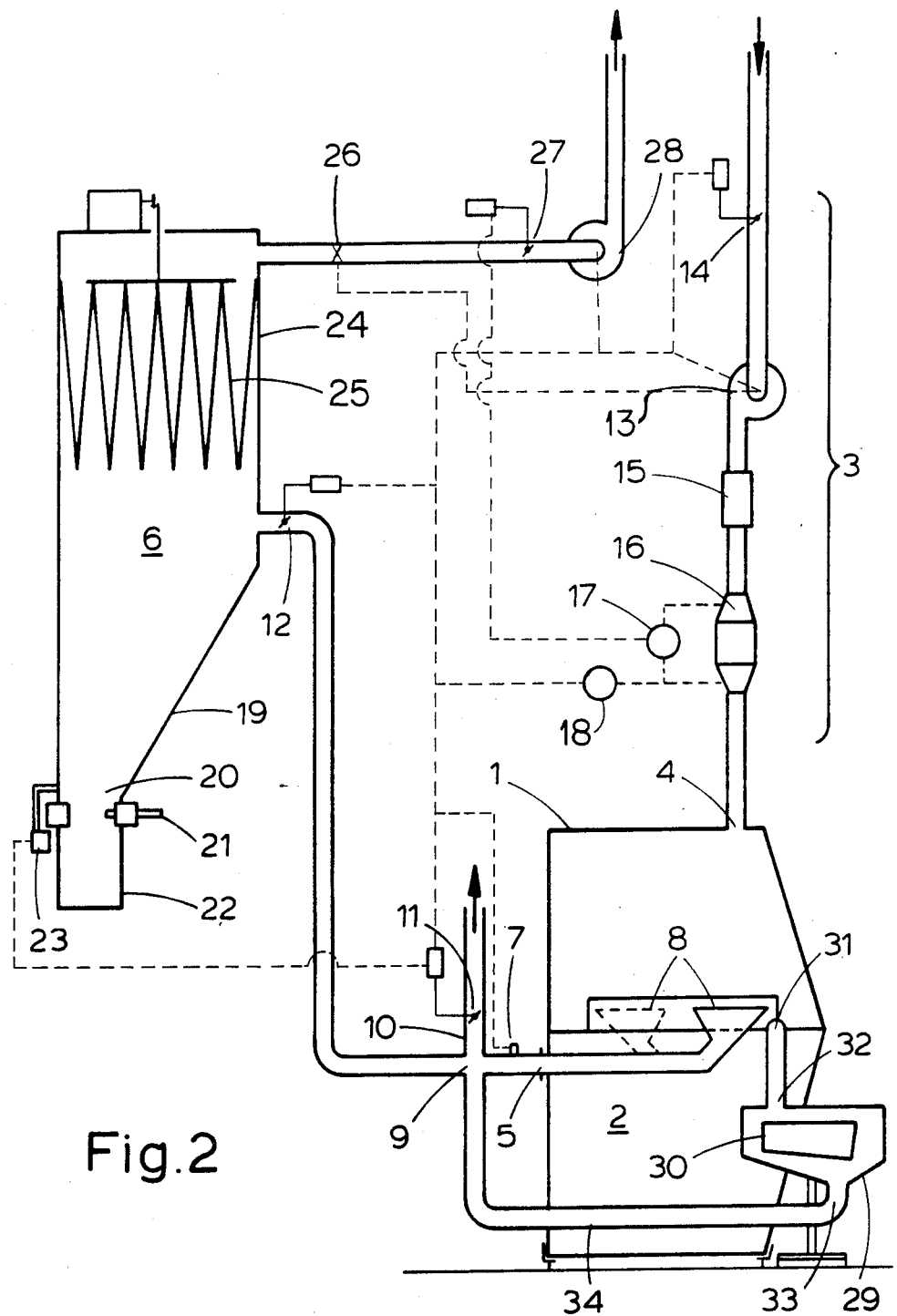

The invention will now be described by way of Example with reference to the accompanying drawings where FIG. 1 is a schematic drawing of dust recovery apparatus according to the invention and FIG. 2 is a modification of the apparatus of FIG. 1.

With reference to the drawings, dust recovery apparatus comprises a housing 1 containing a tableting machine 2 and an air supply system 3 for passing air through the apparatus at a predetermined rate connected to an inlet 4 in the housing. Outlet 5 from the housing is connected to exhaust via a collector 6 and a sensor 7 which detects air-flow rate in the apparatus.

The housing 1 has the air inlet 4 at the top. The working area where tablets are compressed, is provided with outlet ports 8 which pass into the air outlet 5. This outlet opens into a tee-piece 9. One branch 10 of the tee leads to waste via motorized valve 11. The other branch of the tee leads to the collector 6 via motorized valve 12.

The air supply systems consisting of fan 13 provided on its inlet side with a shut-off motorized damper 14. On the outlet side the fan feeds via a constant volume regulator 15 (in this embodiment a Luwa constant volume regulator) into an absolute filter 16. In this embodiment, the filter is a Luwa filter which filters to 99.997% on the U.S. D.O.P. scale. This embodiment also has pressure switches 17 and 18. Switch 17 monitors the pressure drop across the filter and provides a warning when this filter is approaching the end of its useful life. Pressure switch 18 is set to detect pressure above a pre-set level sufficient to guarantee the slight positive pressure in the housing. Should the pressure be below the pre-set value, the switch 18 prevents collection as described below.

The collector 6 consists of a hopper 19 having a lower outlet opening 20 provided with a valve 21, which can be closed when the bin 22 is removed for emptying. The bin 22 makes an airtight fit to the mouth of the hopper outlet valve. In this embodiment, the outlet end of the hopper is fitted with a sensor 23 (in this embodiment an optical sensor) which prevents collection as described below when the bin is not in place.

Above the hopper, the collector has a filter section 24 containing a pleated bag filter 25. In this embodiment the bag is made from polytetrafluoroethylene-faced fabric for example Gortex. The word Gortex is a Registered Trade Mark. The connected bags forming the filter are suspended from a shakeable frame. This frame can be shaken by connecting it through a linkage running to an eccentric drive on an electric motor. The outlet from the collector 6 leads to the air-flow rate sensor 26. Sensor 26 is connected to fan 13 and operates a switch which controls the operation of fan 13. The sensor 26 thereby can operate the switch to cause fan 26 to stop passing air to the collector 6. Beyond the sensor 26 there is a control damper 27 which is motorized and linked to the air-flow rate sensor 7 located (in this embodiment) in the air outlet 5. The damper 27 is regulated by the sensor 7 so as to maintain a constant air flow.

The apparatus is also provided with an extract fan 28 which draws air from the collector to exhaust.

Any pipework between the absolute filter and the outlet from the collector filter is constructed of food quality materials e.g. easily cleanable, impervious, non-contaminating plastics or stainless steels. The whole structure is constructed to be easily demountable to facilitate regular inspection and cleaning.

In use valve 12 and damper 14 are open and valve 11 is closed. Air is blown into the housing 1 by fan 13 and drawn from the ports 8 through the collector 6 by the extract fan 28. The sensor 7 is set so that at a minimum acceptable flow rate it turns off fans 13 and 28 closes valve 12 and damper 14 and opens valve 11 thereby stopping collection and allowing all dust to pass to waste.

Similarly when the pressure sensor 18 detects a pressure below a pre-set value or the bin sensor 23 detects that no bin is fitted, they turn off fans 13 and 28, close valve 12 and damper 14 and open valve 11 thereby stopping collection and allowing all dust to pass to waste.

In the modification shown in FIG. 2, the housing consists of two compartments 1 and 29.

Compartment 1 contains a tableting machine 2 the output of which is connected to a de-dusting machine 30. A duct 31 carries air to the inlet 32 in compartment 29, from compartment 1. The compartment 29 also has an outlet 33 connected via duct 34 to tee-piece 9. In this way air can pass through the second compartment at a predetermined rate.

I claim:

1. A dust recovery apparatus comprising a housing and a collector; said housing having an outlet and outlet; means for passing air through the apparatus at a predetermined rate while maintaining a slight positive pressure in the housing, said means including an inlet duct having a shut off damper and being connected to said inlet, an air supply fan and a regulator disposed in spaced relationship for introducing air into said housing; an outlet duct in said housing connected to said collector, said outlet duct containing an air flow rate sensor between the outlet and the collector and a valve between the sensor and collector, said sensor being connected to the shut off damper, air supply fan, and valve in order to maintain a constant air flow and said collector being connected to an exhaust outlet.

2. The apparatus of claim 1 wherein said inlet duct also contains an absolute filter.

3. The apparatus of claim 1 in which the collector has a filter section.

4. The apparatus of claim 3 wherein the filter section comprises pleated bag filters suspended from a shakeable frame.

5. The apparatus of claim 1 wherein the housing contains a tableting machine.

6. The apparatus of claim 1 wherein an extract fan is connected to said exhaust outlet to draw air from the collector through the exhaust outlet.

* * * * *